Sept. 15, 1936.   C. A. LOVELAND   2,054,262
MILKING STOOL
Filed Oct. 21, 1935
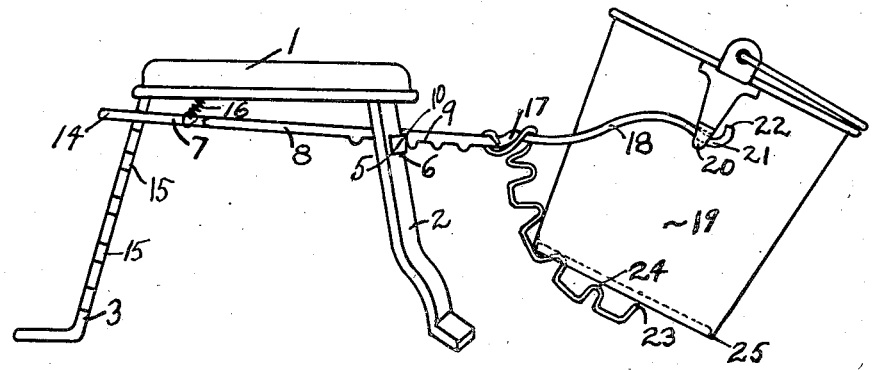
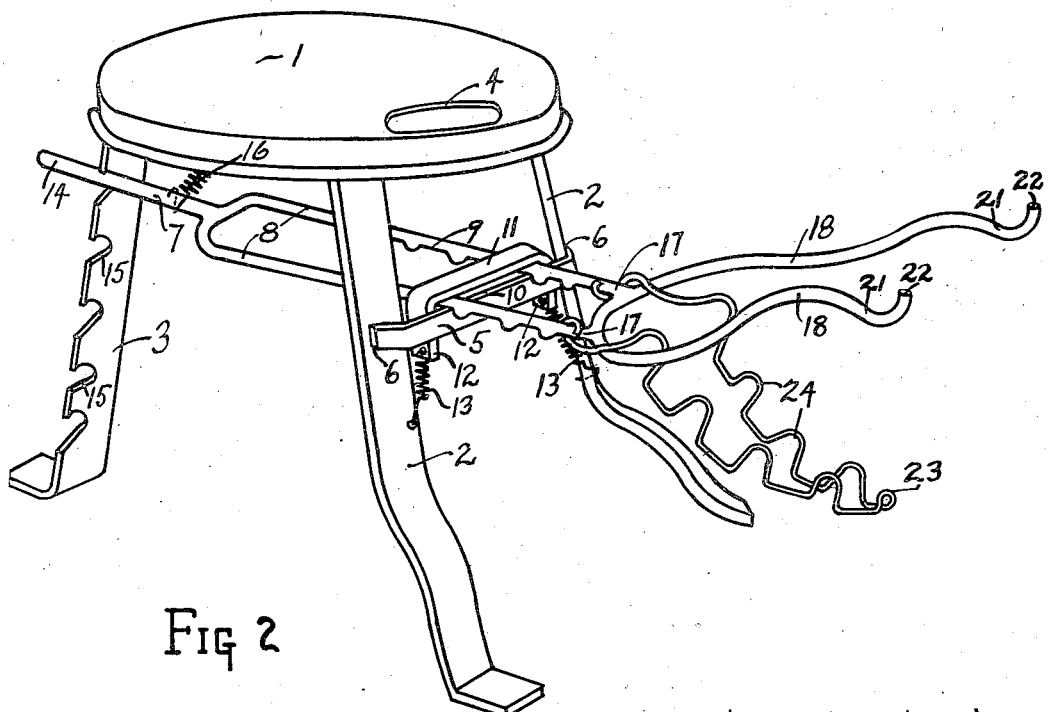
Curtis A. Loveland
INVENTOR.
BY *[signature]*
ATTORNEY.

Patented Sept. 15, 1936

2,054,262

UNITED STATES PATENT OFFICE 2,054,262

MILKING STOOL

Curtis A. Loveland, Youngstown, Ohio

Application October 21, 1935, Serial No. 45,885

9 Claims. (Cl. 31—57)

This invention relates to milking stools and has for its general object to provide a stool having certain adjustments which are of most practical importance in hand milking.

One of the objects of the invention is to provide an adjustable support member for a milk pail in order that the milker may adjust the pail most advantageously for the milking operation.

Another object of the invention is to provide a spring tension means for securely holding the adjustable support member for the milk pail.

Another object of the invention is to provide adjustable means for tilting the pail when held by the adjustable support member.

A further object of the invention is to provide a milking stool which will hold a milk pail in an adjusted position and yet allow for the removal of the pail without making any adjustments or manipulating any releasing means.

With the general objects named in view and others as will hereinafter appear, the invention consists in certain novel and useful features of construction and organization of parts as hereinafter described or the equivalents thereof; and in order that it may be fully understood, reference is to be had to the accompanying drawing, in which:—

Figure 1 is a side elevation of the device supporting a pail in an adjusted position.

Figure 2 is a perspective view of the device with the pail removed.

In the said drawing where like reference characters identify corresponding parts in all of the figures, the device comprises a seat 1 provided with a pair of front legs 2 and a rear leg 3. By referring to Figure 2 it will be seen that the seat 1 is provided with a convenient hand hole 4 for carrying or moving the stool. It will also be seen that the front legs 2 are provided with a support bar 5 secured at points 6.

Underneath the seat 1 there is provided a frame member 7 formed with two oppositely disposed arms 8. A plurality of notches 9 are formed underneath these oppositely disposed arms 8. By referring to Figure 2 it will be seen that the oppositely disposed arms 8 are carried by the support bar 5 with the notches 9 fitting over the upper edge 10 of the support bar 5. In order to hold the arms 8 securely in an adjusted position upon the support bar 5 there is provided a grip member 11 which is provided with down-turned ends 12. This grip member 11 is held under tension by means of coil springs 13. The springs 13 have their upper ends secured to the down-turned ends 12 of the grip bar 11 and the lower ends secured to the front legs 2.

It will also be seen that the frame member 7 is provided with an outwardly extending end 14 which is utilized as an adjusting means in raising or lowering the pail held by the device. In order to do this the rear leg 3 is provided with a plurality of notches 15 in which rests the frame member 7. In order that the frame member 7 may be held securely in an adjusted position in a notch 15 there is provided a coil spring 16, one end of which is secured underneath the seat 1 while the other end is secured to the frame 7 thereby exerting an upward and inward pull.

It will also be seen that the outer ends 17 of the oppositely disposed arms 8 are secured to and carry a pair of outwardly and upwardly curved pail support arms 18. By referring to Figure 1 it will be seen that a pail 19 is provided with bracket members 20. The pail support arms 18 fit underneath the lower ends of the bracket members 20 holding the pail 19 at a point 21 on the arms 18. The extreme outer ends 22 of the arms 18 are upturned in order to prevent the pail from slipping outwardly from between the arms 18.

By referring to the drawing it will be seen that the pail 19 is also held in an adjusted tilted position by means of a tilt regulator 23. This tilt regulator is provided with a plurality of tilt rests 24 in order that a downwardly extended flange 25 of the pail 19 may be securely held in a tilt rest thereby holding the pail in a tilted position. The tilt regulator 23 is preferably made of spring wire and is attached to the arms 8 at the extreme outer ends 17.

What I claim is:—

1. In a milking stool comprising a seat member, a pair of front legs and a rear leg for said seat member, a support bar secured in a horizontal position between said front legs, means for holding a pail in an adjustable manner so as to raise and lower said pail, and means for holding said pail in a tilted position, together with means for moving said pail outwardly and inwardly in relation to said stool.

2. The combination of a milking stool having a pair of front legs and a rear leg, said rear leg having a plurality of notches, a support bar between said front legs, a frame member adapted to be adjustably mounted in any one of said notches, two oppositely disposed arms on said frame member, said arms having a plurality of notches adapted to fit over said support bar, and a pair of pail support arms attached to said oppositely disposed arms.

3. The combination of a milking stool having a pair of front legs and a rear leg, said rear leg having a plurality of notches, a support bar between said front legs, a frame member adapted to be adjustably mounted in any one of said notches, two oppositely disposed arms on said frame member, said arms having a plurality of notches adapted to fit over said support bar, a pair of pail support arms attached to said oppositely disposed arms for supporting a pail by means of a bracket attached thereto, a tilt regulator attached to outer ends of said oppositely disposed arms, and a plurality of tilt rests on said regulator for holding said pail in an adjustable tilted position.

4. A combination milking stool and adjustable pail support comprising a seat, a pair of front legs and a rear leg for said seat, said rear leg having a plurality of notches, a support bar between said front legs, a frame member adjustably mounted in any one of said notches, two oppositely disposed arms on said frame member having a plurality of notches fitting over said support bar providing horizontal adjustment for said frame, and a pair of pail support arms attached to said oppositely disposed arms for supporting a pail by means of a bracket attached thereto.

5. In a milking stool, a seat, a pair of front legs and a rear leg for said seat, said rear leg having a plurality of notches, a support bar between said front legs, a frame member adjustably mounted in any one of said notches, two oppositely disposed arms on said frame member having a plurality of notches fitting over said support bar providing horizontal adjustment for said frame member, means for holding said frame member in a locked position in one of said notches in the rear leg and means for holding said oppositely disposed arms in a locked position over said support bar, and a pair of pail support arms attached to said oppositely disposed arms for supporting a pail.

6. In a milking stool, a seat, a pair of front legs and a rear leg for said seat, said rear leg having a plurality of notches, a support bar between said front legs, a frame member adjustably mounted in any one of said notches, a coil spring for holding said frame member securely in position in one of said notches, two oppositely disposed arms on said frame member having a plurality of notches fitting over said support bar providing horizontal adjustment for said frame, a grip member fitting over said oppositely disposed arms, a pair of coil springs holding said grip member under tension thereby locking said oppositely disposed arms in position upon said support bar, a pair of pail support arms attached to said oppositely disposed arms for supporting a pail, a tilt regulator attached to the outer ends of said oppositely disposed arms, and a plurality of tilt rests on said regulator for holding said pail in an adjustable tilted position.

7. In a milking stool, a seat, a pair of front legs and a rear leg for said seat, said rear leg having a plurality of notches, a support bar between said front legs, a frame member adjustably mounted in any one of said notches, two oppositely disposed arms on said frame member having a plurality of notches fitting over said support bar providing horizontal adjustment for said frame, means for holding said frame in a locked position in one of said notches in the rear leg and means for holding said oppositely disposed arms in a locked position over said support bar, a pair of pail support arms attached to said oppositely disposed arms, adapted to hold a pail having a pair of brackets thereon, the lower end of which rests upon said pail support arm, a tilt regulator attached to the outer ends of said oppositely disposed arms, and a plurality of tilt rests on said regulator for holding said pail in an adjustable tilted position.

8. A combination milking stool and adjustable pail support comprising a seat, a pair of front legs and a rear leg for said seat, said rear leg having a plurality of notches, a support bar between said front legs, a frame member adjustably mounted in any of said notches, a coil spring for holding said frame member securely in position in one of said notches, two oppositely disposed arms on said frame member having a plurality of notches fitting over said support bar providing horizontal adjustment for said frame, a grip member fitting over said oppositely disposed arms, downturned ends on said grip member, a pair of coil springs attached to said downturned ends and to said front legs holding said grip member under tension thereby locking said oppositely disposed arms in position upon said support bar, a pair of pail support arms attached to said oppositely disposed arms for supporting a pail, a tilt regulator attached to the outer ends of said oppositely disposed arms, and a plurality of tilt rests on said regulator upon which the flange of a pail may rest.

9. In a milking stool, a seat, a hand hole in said seat for moving or carrying said stool, a pair of front legs and a rear leg for said seat, said rear leg having a plurality of notches, a support bar between said front legs, a frame member adjustably mounted in any one of said notches, a coil spring for holding said frame member securely in position in one of said notches, two oppositely disposed arms on said frame member having a plurality of notches fitting over said support bar providing horizontal adjustment for said frame, a grip member fitting over said oppositely disposed arms, a pair of coil springs holding said grip member under tension thereby locking said oppositely disposed arms in position upon said support bar, a pair of pail support arms attached to said oppositely disposed arms for supporting a pail, a tilt regulator attached to the outer ends of said oppositely disposed arms, said tilt regulator being formed of spring wire, and a plurality of tilt rests on said regulator for holding said pail in an adjustable tilted position.

CURTIS A. LOVELAND.